United States Patent
Oka et al.

(10) Patent No.: US 12,435,997 B2
(45) Date of Patent: Oct. 7, 2025

(54) MAGNETIC FIELD DETECTION DEVICE, MAGNETIC SENSOR MODULE, MAGNETIC CONTROL DEVICE, MOTOR AND TRANSMISSION

(71) Applicant: TDK Corporation, Tokyo (JP)

(72) Inventors: Teiichiro Oka, Tokyo (JP); Ryoichi Menju, Tokyo (JP); Makoto Takahashi, Tokyo (JP); Hiroyuki Hirano, Tokyo (JP)

(73) Assignee: TDK CORPORATION, Tokyo (JP)

( * ) Notice: Subject to any disclaimer, the term of this patent is extended or adjusted under 35 U.S.C. 154(b) by 196 days.

(21) Appl. No.: 18/343,952

(22) Filed: Jun. 29, 2023

(65) Prior Publication Data
US 2024/0019270 A1    Jan. 18, 2024

(30) Foreign Application Priority Data

Jul. 12, 2022 (JP) .................................. 2022-111560

(51) Int. Cl.
*G01D 5/14*    (2006.01)
(52) U.S. Cl.
CPC ...................... *G01D 5/14* (2013.01)
(58) Field of Classification Search
CPC ........................................................ G01D 5/14
See application file for complete search history.

(56) References Cited

U.S. PATENT DOCUMENTS

| 7,313,943 B2* | 1/2008 | Smith .................... F16D 48/06 |
| | | 73/1.79 |
| 10,323,654 B2* | 6/2019 | Zhang ................. F04D 29/5813 |
| 2010/0321006 A1 | 12/2010 | Suzuki |
| 2015/0377649 A1 | 12/2015 | Nakayama |
| 2017/0085138 A1 | 3/2017 | Nakano et al. |

FOREIGN PATENT DOCUMENTS

| JP | 2009-204567 A | 9/2009 |
| JP | 2011-2311 A | 1/2011 |
| JP | 2013-104698 A | 5/2013 |
| JP | 2015-529325 A | 10/2015 |
| JP | 2016-11843 A | 1/2016 |

(Continued)

*Primary Examiner* — Reena Aurora
(74) *Attorney, Agent, or Firm* — Posz Law Group, PLC

(57) ABSTRACT

A magnetic field detection device includes a magnetic field generation unit that generates a magnetic field, a magnetic field detection unit that detects the magnetic field, a first housing that has an accommodation unit that accommodates the magnetic field detection unit so that the magnetic field detection unit is exposed, and a second housing that movably accommodates a moving body. The strength or angle of the magnetic field generated from the magnetic field generation unit and applied to the magnetic field detection unit changes in accordance with movement of the moving body. The second housing has a mounting unit on which the first housing is mounted. The first housing is mounted on the mounting unit via a seal member that surrounds the magnetic field detection unit, so that the mounting unit is between the magnetic field detection unit and the moving body, and the inside of the accommodation unit is sealed by the seal member and the mounting unit.

20 Claims, 6 Drawing Sheets

(56) References Cited

FOREIGN PATENT DOCUMENTS

| JP | 2018-4414 A | 1/2018 |
|----|-------------|--------|
| JP | 2019-115122 A | 7/2019 |
| JP | 2019-129641 A | 8/2019 |
| WO | 2014028741 A2 | 2/2014 |
| WO | 2014028741 A3 | 2/2014 |
| WO | 2015/186455 A1 | 12/2015 |
| WO | 2018/062007 A1 | 4/2018 |

* cited by examiner

MAGNETIC FIELD DETECTION DEVICE, MAGNETIC SENSOR MODULE, MAGNETIC CONTROL DEVICE, MOTOR AND TRANSMISSION

CROSS-REFERENCE TO RELATED APPLICATION

This application claims priority from Japanese Patent Application No. 2022-1115600 filed on Jul. 12, 2022, the entire contents of which are incorporated herein by reference.

BACKGROUND

The present disclosure relates to a magnetic field detection device, a magnetic sensor module, a magnetic control device, a motor and a transmission.

In recent years, for various applications such as the detection of the rotational position of a steering wheel or power steering motor in automobiles, the torque of the shaft of a transmission, or the like, magnetic angle sensors, for example, that generate an angle detection value having the angle and corresponding coordinates of a target object, have been widely used. Magnetic angle sensors use a magnetic field generation unit such as a magnet that generates a rotating magnetic field the direction of which rotates in conjunction with the rotation or linear motion of the target object. A magnetic field detection unit provided with the angle sensor outputs a detection signal in accordance with changes in the magnetic field generated from the magnetic field generation unit.

As a magnetic field detection device using the above-described magnetic angle sensor, one is known in which a sensor module 100, in which an angle sensor 101 and an electric circuit board 102 for inputting a detection signal output from the angle sensor 101 to an ECU (Electronic Control Unit) of an automobile are modularized, is provided in a housing that movably accommodates an object 202, for example as shown in FIG. 12. This modularized sensor module 100 has a sealed structure, and thus can protect the angle sensor 101, the electric circuit board 102 and the like, from water, lubricating oil, dust, or the like. Refer to, for example, International Publication No. 2018-062007 (WO-A1-2018/062007).

It is desirable to shorten the distance between a magnetic field generation unit 203 and the angle sensor 101 to the extent possible. By shortening the distance between the two, it is possible to use a small, inexpensive magnet as the magnetic field generation unit 203.

SUMMARY

Example embodiments are directed to a magnetic field detection device including: a magnetic field generation unit that generates a magnetic field, a magnetic field detection unit that detects the magnetic field, a first housing that has an accommodation unit that accommodates the magnetic field detection unit so that the magnetic field detection unit is exposed, and a second housing that movably accommodates a moving body. The strength or angle of the magnetic field generated from the magnetic field generation unit and applied to the magnetic field detection unit changes in accordance with movement of the moving body. The second housing may have a mounting unit on which the first housing is mounted. The first housing may be mounted on the mounting unit via a seal member that surrounds the magnetic field detection unit, so that the mounting unit is between the magnetic field detection unit and the moving body. The inside of the accommodation unit may be sealed by the seal member and the mounting unit.

Example embodiments are directed to a magnetic sensor module used to detect a magnetic field, the strength or angle of which changes accompanying movement of a moving body. The magnetic sensor module includes a magnetic field detection unit, which detects a magnetic field generated from a magnetic field generation unit, and a first housing, which has an accommodation unit that accommodates the magnetic field detection unit so that the magnetic field detection unit is exposed. The magnetic field detection unit may be provided at a position where the magnetic field, which is generated from the magnetic field generation unit and the strength or angle of which changes accompanying movement of the moving body, is applied to the magnetic field detection unit. The first housing may be configured to be mountable on the second housing, which movably accommodates the moving body, so that the second housing is between the magnetic field detection unit and the moving body.

Example embodiments are directed to a magnetic sensor module used to detect a magnetic field, the strength or angle of which changes accompanying movement of a moving body. The magnetic sensor module includes a magnetic field detection unit, which detects a magnetic field generated from a magnetic field generation unit, and a first housing having an accommodation unit, which accommodates the magnetic field detection unit so that the magnetic field detection unit is exposed. The magnetic field detection unit is provided at a position where the magnetic field, which is generated from the magnetic field generation unit and the strength or angle of changes accompanying movement of the moving body, is applied to the magnetic field detection unit. The first housing may have a seal member provided to surround the magnetic field detection unit, and the first housing may be configured to be mountable on the second housing that movably accommodates the moving body so that that the second housing is between the magnetic field detection unit and the moving body and so that the inside of the accommodation unit is sealed by the seal member and the second housing.

Example embodiments are directed to an electric control device provided with the above-described magnetic field detection device.

Example embodiments are directed to a motor including at least the above-described magnetic field detection device, where the moving body is a motor shaft capable of rotation about a predetermined rotation axis, and the magnetic field detection device detects the rotation angle of the motor shaft.

Example embodiments are directed to a transmission including at least the above-described magnetic field detection device, wherein the moving body is a shaft capable of rotation about a predetermined rotation axis, and the magnetic field detection device detects the rotation angle of the shaft.

BRIEF DESCRIPTION OF THE DRAWINGS

The accompanying drawings are included to provide a further understanding of the example embodiments and are incorporated in and constitute a part of this specification. The drawings illustrate example embodiments and, together with the specification, serve to explain the principles of the technology.

DESCRIPTION

Figures 1, 2:
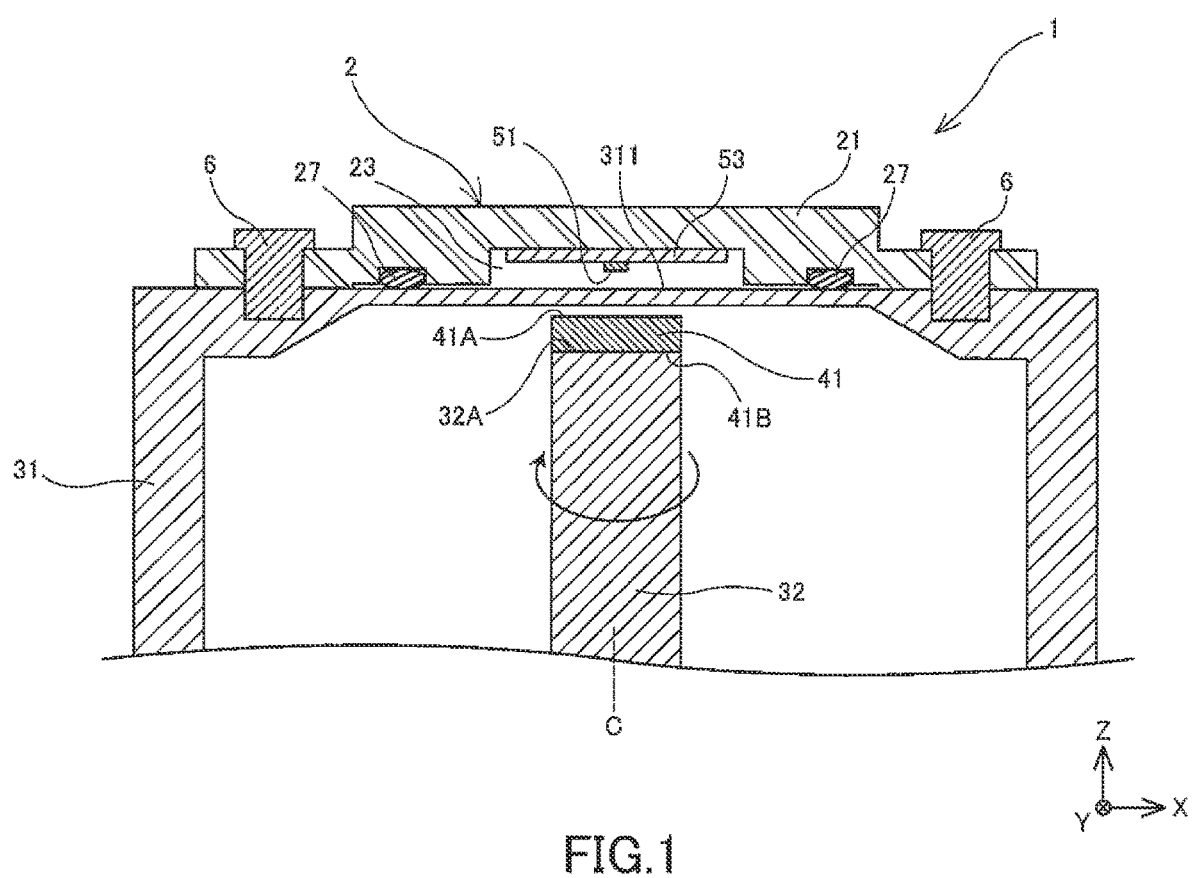
FIG. 1 is a cross-sectional view showing a schematic configuration of a magnetic field detection device according to one embodiment.
FIG. 2 is a perspective view of a magnetic sensor module in one embodiment and shows a schematic configuration of a mode without sealing materials.
Figure 3:
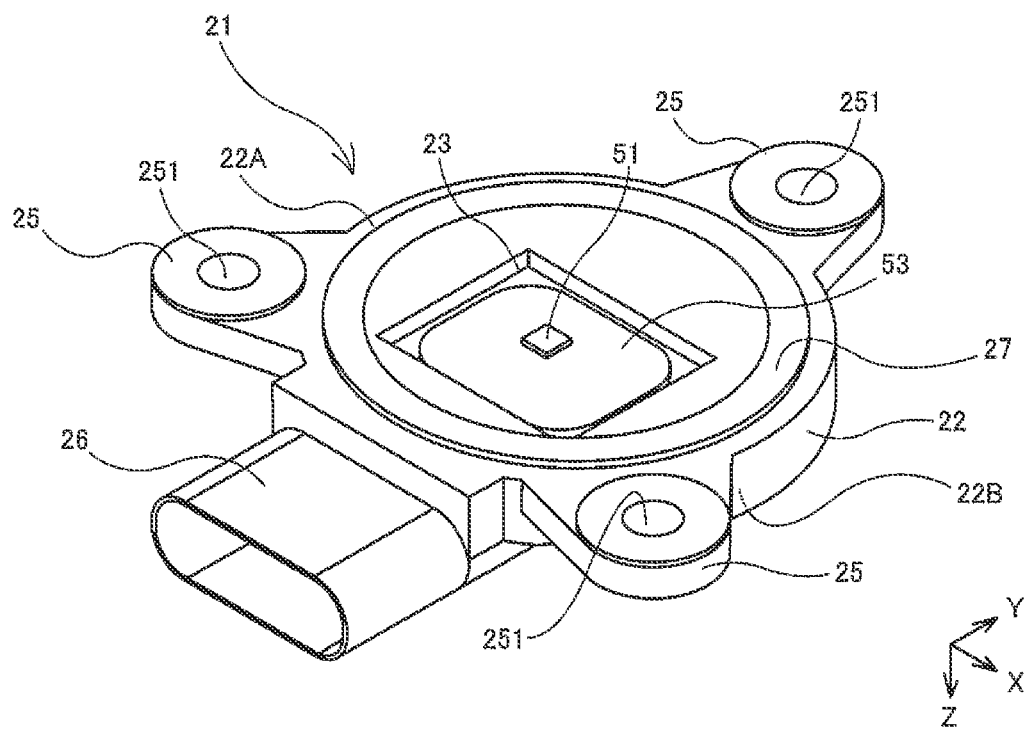
FIG. 3 is a perspective view of a magnetic sensor module in one embodiment and shows a schematic configuration of a mode with sealing materials.

In the following, some example embodiments and modification examples of the technology are described in detail with reference to the accompanying drawings. The following description is directed to illustrative examples of the disclosure and not to be construed as limiting the technology. Factors including, without limitation, numerical values, shapes, materials, components, positions of the components, and how the components are coupled to each other are illustrative only and not to be construed as limiting the technology. Further, elements in the following example embodiments which are not recited in a most-generic independent claim of the disclosure are optional and may be provided on an as-needed basis. The drawings are schematic and are not intended to be drawn to scale. Like elements are denoted with the same reference numerals to avoid redundant descriptions.

The following example embodiments provide a rotation angle detection device capable of improved detection accuracy and a magnetic sensor module, a magnetic control device, or a motor and transmission that includes such a rotation angle detection device.

DETAILED DESCRIPTION

A first aspect of the example embodiments is a magnetic field detection device including: a magnetic field generation unit that generates a magnetic field, a magnetic field detection unit that detects the magnetic field, a first housing that has an accommodation unit that accommodates the magnetic field detection unit so that the magnetic field detection unit is exposed, and a second housing that movably accommodates a moving body. The strength or angle of the magnetic field generated from the magnetic field generation unit and applied to the magnetic field detection unit changes in accordance with movement of the moving body. The second housing may have a mounting unit on which the first housing is mounted. The first housing may be mounted on the mounting unit via a seal member that surrounds the magnetic field detection unit, so that the mounting unit is between the magnetic field detection unit and the moving body. The inside of the accommodation unit may be sealed by the seal member and the mounting unit.

A second aspect of the example embodiments is characterized in that, in the above-described first aspect, the magnetic field generation unit may be provided on the moving body so as to be moveable integrally with the moving body.

A third aspect of the example embodiments is characterized in that, in the above-described first aspect, the magnetic field generation unit may be provided inside the first housing.

A fourth aspect of the example embodiments is characterized in that, in any one of the above-described first through third aspects, in at least one out of the first housing and the second housing, a position-determining unit may be provided that determines the position at which the first housing is mounted on the second housing.

A fifth aspect of the example embodiments is characterized in that, in the above-described fourth aspect, the position-determining unit may be provided more distally than the seal member when viewed from the magnetic field detection unit.

A sixth aspect of the example embodiments is characterized in that, in the above-described fourth or fifth aspect, the mounting unit of the second housing may include a first mounting unit that is relatively thick and a second mounting unit that is relatively thin, the first mounting unit may be positioned to surround the second mounting unit, and the position-determining unit may be provided at a position equivalent to the first mounting unit.

A seventh aspect of the example embodiments is characterized in that, in any one of the above-described first through sixth aspects, the thermal conductivity of the material comprising the seal member may be smaller than the thermal conductivity of the material comprising the first housing.

An eighth aspect of the example embodiments is characterized in that, in any one of the above-described first through seventh aspects, the first housing may be fixed to the second housing by a fixing screw.

A ninth aspect of the example embodiments is characterized in that, in any one of the above-described fourth through sixth aspects, the first housing may have a first screw hole as the position-determining unit, the second housing may have a second screw hole as the position-determining unit, and the first housing may be fixed to the second housing by a fixing screw inserted into the first screw hole and the second screw hole, which substantially overlap.

A tenth aspect of the example embodiments is characterized in that, in any one of the above-described first through ninth aspects, the first housing may have a seal groove into which the seal member can be interlocked.

An eleventh aspect of the example embodiments is characterized in that, in any one of the above-described first through tenth aspects, the seal member may be made of an elastomer material.

A twelfth aspect of the example embodiments is characterized in that, in any one of the above-described first through eleventh aspects, the seal member may be made of a fluoro-rubber or a silicon rubber.

A thirteenth aspect of the example embodiments is characterized in that, in any one of the above-described first through twelfth aspects, the first housing may be made of polyphenylene sulfide resin, polybutylene terephthalate resin, or polyamide resin.

A fourteenth aspect of the example embodiments is characterized in that, in any one of the above-described first through thirteenth aspects, the second housing may be made of a nonmagnetic material.

A fifteenth aspect of the example embodiments is characterized in that, in any one of the above-described first through fourteenth aspects, the moving body may be a rotating body that rotates about a predetermined rotation axis.

A sixteenth aspect of the example embodiments is characterized in that, in any one of the above-described first through fourteenth aspects, the moving body may be a linearly moving body that moves linearly.

A seventeenth aspect of the example embodiments is a magnetic sensor module used to detect a magnetic field, the strength or angle of which changes accompanying movement of a moving body. The magnetic sensor module includes a magnetic field detection unit, which detects a magnetic field generated from a magnetic field generation unit, and a first housing, which has an accommodation unit that accommodates the magnetic field detection unit so that the magnetic field detection unit is exposed. The magnetic field detection unit may be provided at a position where the magnetic field, which is generated from the magnetic field generation unit and the strength or angle of which changes accompanying movement of the moving body, is applied to the magnetic field detection unit. The first housing may be configured to be mountable on the second housing that movably accommodates the moving body so that the second housing is between the magnetic field detection unit and the moving body.

An eighteenth aspect of the example embodiments is a magnetic sensor module used to detect a magnetic field the strength or angle of which changes accompanying movement of a moving body. The magnetic sensor module includes a magnetic field detection unit that detects a magnetic field generated from a magnetic field generation unit, and a first housing having an accommodation unit that accommodates the magnetic field detection unit so that the magnetic field detection unit is exposed. The magnetic field detection unit is provided at a position where the magnetic field, which is generated from the magnetic field generation unit and the strength or angle of which changes accompanying movement of the moving body, is applied to the magnetic field detection unit. The first housing may have a seal member provided to surround the magnetic field detection unit, and the first housing may be configured to be mountable on the second housing that movably accommodates the moving body so that that the second housing is between the magnetic field detection unit and the moving body and so that the inside of the accommodation unit is sealed by the seal member and the second housing.

A nineteenth aspect of the example embodiments is an electric control device provided with the magnetic field detection device according to any one of the above-described first through sixteenth aspects.

A twentieth aspect of the example embodiments is a motor including at least the magnetic field detection device according to any one of the above-described first through sixteenth aspects, where the moving body is a motor shaft capable of rotation about a predetermined rotation axis, and the magnetic field detection device detects the rotation angle of the motor shaft.

A twenty-first aspect of the example embodiments a transmission including at least the magnetic field detection device according to any one of the above-described first through sixteenth aspects, where the moving body is a shaft capable of rotation about a predetermined rotation axis, and the magnetic field detection device detects the rotation angle of the shaft.

A magnetic field detection device according to the example embodiments will be described with reference to the drawings.

In the magnetic field detection device according to the example embodiments, "X-axis, Y-axis and Z-axis" are defined in some drawings as needed. The X-axis and Y-axis are directions orthogonal to each other in a plane parallel to a first surface and a second surface, and the Z-axis is the axial direction of a rotation axis. In addition "parallel" is a concept that includes two line segments, axes, directions, planes or the like being completely parallel and also such being substantially parallel (having an angle of intersection of 5° or less), and "orthogonal" is a concept that includes two line segments, axes, directions, planes or the like being completely orthogonal and also such being substantially orthogonal (having an angle of intersection in the range of 85~95°).

As shown in FIG. 1, a magnetic field detection device 1, according to some exemplary embodiments, may include a magnetic sensor module 2, a second housing 31 to which the magnetic sensor module 2 is attached, a rotating body 32 rotatably accommodated in the second housing 31, and a magnet 41 magnetized in one direction. The magnet 41 is rotationally provided integrally with the rotating body 32 at one end 32A (the end positioned on the magnetic sensor module 2 side) of the rotating body 32. The magnetic field detection device 1 is used to detect the rotation angle of the magnet 41 that rotates integrally with the rotating body 32 that rotates about a rotation axis C.

The magnetic sensor module 2 may include a magnetic field detection unit 51 that detects changes in the angle of the applied magnetic field generated from the magnet 41 that rotates integrally with the rotating body 32, a circuit board 53 on which the magnetic field detection unit 51 and an arithmetic processing unit 52 (see FIG. 4) are mounted, and a first housing 21 that has an accommodation unit 23 that accommodates the circuit board 53 such that the magnetic field detection unit 51 is exposed.

The magnetic field detection unit 51 may include, for example, a magnetoresistance effect element such as a TMR element, a GMR element or the like having a laminated structure including a free layer and a magnetization fixed layer, or a Hall element, or the like. The magnetic field detection unit 51 outputs an electrical signal that represents fluctuations of the applied magnetic field to the arithmetic processing unit 52 (see FIG. 4).

Figure 4:
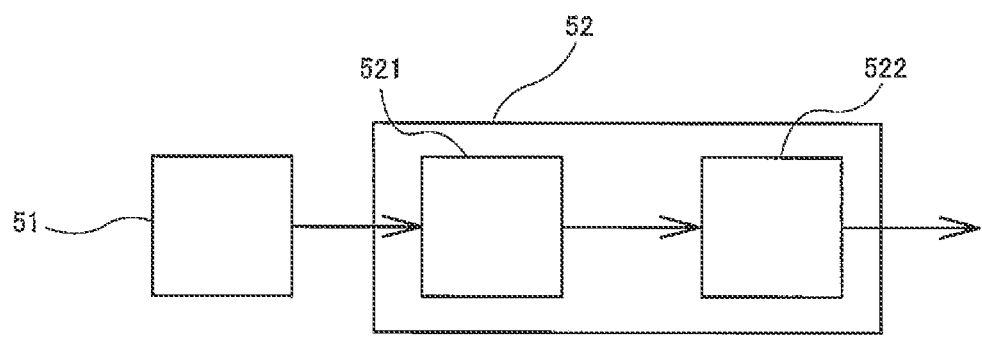
FIG. 4 is a block diagram showing a schematic configuration of a magnetic field detection unit and an arithmetic processing unit in one embodiment.
Figure 5:
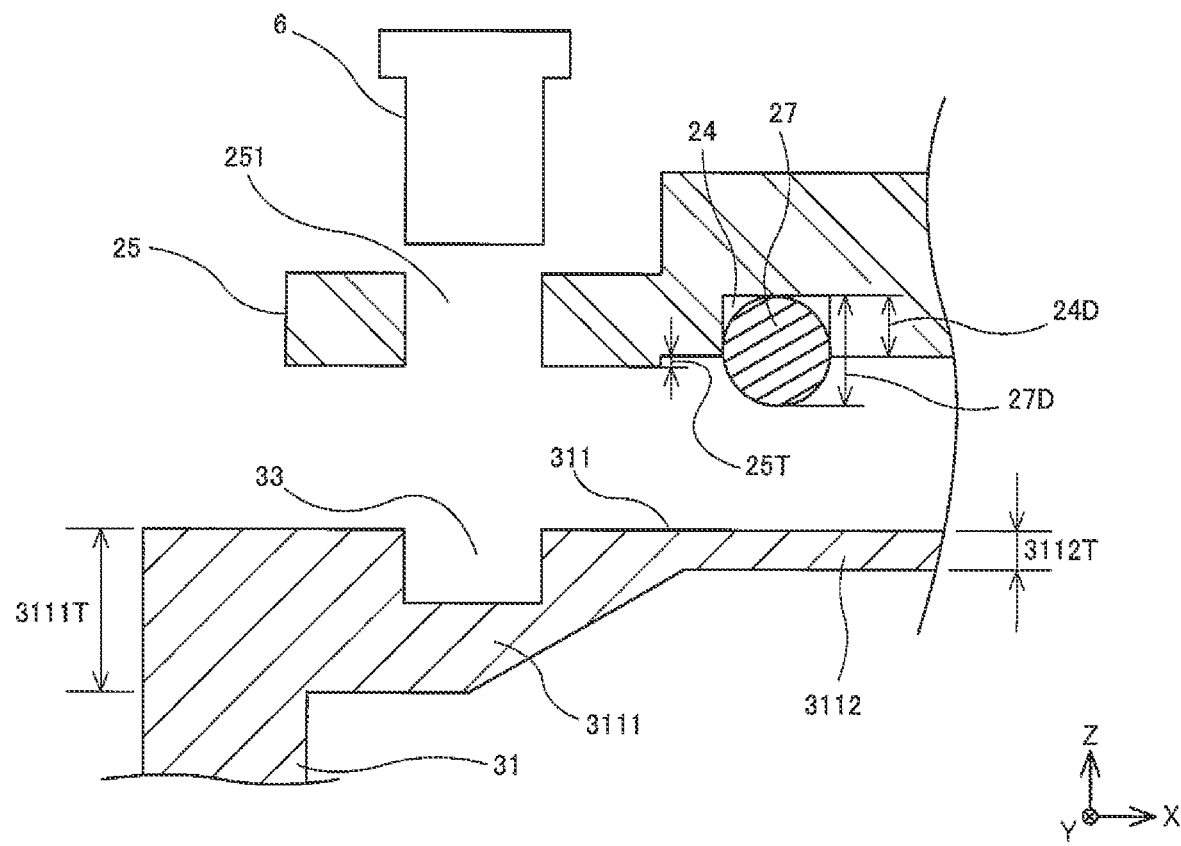
FIG. 5 is a partially exploded cross-sectional view showing a schematic configuration of the magnetic field detection device according to one embodiment.

The arithmetic processing unit 52 may include an A/D (analog-digital) conversion unit 521 that converts the analog signal output from the magnetic field detection unit 51 into a digital signal, and a calculation unit 522 that accomplishes arithmetic processing of the digital signal converted to digital by the A/D conversion unit 521 (see FIG. 4).

The signal (analog signal) output from the magnetic field detection unit 51 may be converted into a digital signal by the A/D conversion unit 521, and the digital signal is input to the calculation unit 522. The calculation unit 522 accomplishes arithmetic processing based on the digital signal converted from the analog signal by the A/D conversion unit 521. The calculation unit 55 may include, for example, a microcomputer, an Application Specific Integrated Circuit (ASIC), or the like.

The magnetic field detection unit 51 and the arithmetic processing unit 52 may be integrated (monolithically) into one chip, both may be resin-sealed into a single package, or both may be separately and independently resin-sealed.

As shown in FIG. 2, the first housing 21 may include a housing main body 22 having a first surface 22A and a second surface 22B facing the first surface 22A, an accommodation unit 23 formed in the first surface 22a of the housing main body 22, a seal groove 24, which is the first surface 22A of the housing main body 22 and is formed to surround the accommodation unit 23, a plurality (three, in the embodiment of FIG. 2) of first positioning units 25 provided at the outer perimeter of the housing main body 22, and a connector unit 26 that is electrically connected to the circuit board 53 accommodated in the accommodation unit 23 from the second surface 22B side of the housing main body 22 and that outputs to the outside a signal or the like arithmetically processed by the arithmetic processing unit 52.

The housing main body 22 may have a substantially circular shape in plan view from the first surface 22A side, the accommodation unit 23 is formed in substantially the center thereof, and a substantially annular groove 24 is formed surrounding the outer side of the accommodation unit 23.

The accommodation unit 23 may be a substantially rectangular concave portion in a plan view and has a size capable of accommodating the circuit board 53. The depth of the concave portion of the accommodation unit 23 may be such that when the circuit board 53 is accommodated and the first housing 21 is mounted on a mounting unit 311 of the second housing 31, the magnetic field detection unit 51 mounted on the circuit board 53 does not come into contact with the mounting unit 311, and such that the distance between the magnet 41 and the magnetic field detection unit 51 is the desired length.

The seal groove 24 may be a substantially annular groove that surrounds the outer side of the accommodation unit 23 when viewed in a plan view from the first surface 22A side. The width of the seal groove 24 may be such that a seal member 27 can be fitted therein. The depth 24D of the seal groove 24 can be appropriately set in accordance with the compression margin of the seal member 27 when the first housing 21 is mounted on the mounting unit 311 of the second housing 31.

A plurality of first positioning units 25 may be provided on the outer circumference of the housing main body 22. In the embodiment of FIG. 2, three first positioning units 25 are provided on the outer circumference of the housing main body 22 at 120° intervals. A first screw hole 251 into which a fixing screw 6 can be inserted is formed in the center of the first positioning unit 25. By aligning with a second screw hole 33 formed in the mounting unit 311 of the second housing 31, the first screw hole 251 plays a role of defining the position where the first housing 21 is attached to the second housing 31. By aligning the first screw hole 251 and the second screw hole 33 of the second housing 31 and inserting the fixing screw 6 into the first screw hole 251 and the second screw hole 33 and screwing these together, the first housing 21 and the second housing 31 can be fixed.

Each first positioning unit 25 may be provided on the outer circumference of the housing main body 22 to have a step between the first positioning unit 25 and the first surface 22A of the housing main body 22. The height 25T of the step can be appropriately set in accordance with the depth 24D of the seal groove 24, the cross-sectional diameter 27D of the seal member 27 and the compression margin of the seal member 27. For example, when the depth 24D of the seal groove 24 is A (mm), the cross-sectional diameter 27D of the seal member 27 is B (mm), and the compression margin of the seal member 27 is C (mm), the height 25T of the step may be a value calculated by the formula "B−(C+A)".

Examples of materials that make up the first housing 21 include synthetic resins such as polyphenylene sulfide resin, polybutylene terephthalate resin, and polyamide resin. The material that makes up the seal member 27 is preferably an elastomer with excellent weather resistance, and more preferably a material having a thermal conductivity lower than the thermal conductivity of the material that makes up the first housing 21. Examples of such elastomer materials include silicone rubber and fluoro-rubber. In the embodiment of FIG. 1, the magnetic field detector 51 is located in the sealed space between the first housing 21 and the mounting unit 311 of the second housing 31, but because the resistance value of the magnetoresistance effect element or the like comprising the magnetic field detection unit 51 changes with temperature, it is preferred that heat is not readily conveyed to the magnetic field detection unit 51 in order to improve detection accuracy. Since the thermal conductivity of the elastomer material that makes up the seal member 27 is smaller than the thermal conductivity of the material that makes up the first housing 21, heat is less likely to be conveyed to the magnetic field detector 51 located in the sealed space formed by the seal member 27, so it is possible to improve detection accuracy.

The second housing 31 rotatably accommodates the rotating body 32 having the magnet 41 at the one end 32A and may have a substantially cylindrical shape. Of the walls of the second housing 31, the outer surface of the wall facing the magnet 41 is the mounting unit 311 to which the first housing 21 is mounted.

The mounting unit 311 may include a relatively thick first mounting unit 3111 and a relatively thin second mounting unit 3112. The first mounting unit 3111 is positioned to surround the second mounting unit 3112. The second mounting unit 3112 may be positioned between the magnet 41 and the magnetic field detection unit 51. The first mounting unit 3111 may be formed with a second screw hole 33 as a second positioning unit. The second screw hole 33 may be formed at a position corresponding to the first screw hole 251 of the first housing 21 attached to the mounting unit 311.

The thickness 3111T of the first mounting unit 3111 may be set appropriately so that the second screw hole 33 can be formed and so that the strength of the second housing 31 is not affected. The thickness 3112T of the second mounting unit 3112 may be set appropriately so that the distance between the magnet 41 and the magnetic field detection unit 51 is the desired distance.

The magnet 41 may be integrally rotatable with the rotating body 32, which is a rotating body that rotates about a rotating axis C and rotates about the rotating axis C in conjunction with the rotation of the rotating body 32. The magnet 41 may have a first surface 41A orthogonal to the rotation axis C of the rotating body 32 and a second surface 41B located on the side opposite the first surface 41A. The first surface 41A and the second surface 41B of the magnet 41 may be surfaces parallel to the XY plane. The magnet 41 may be attached to one end 32A of the rotating body 32 so that the centers of gravity (centers) of the first surface 41A and the second surface 41B match the rotation axis C of the rotating body 32 (see FIG. 1 and so forth). The magnet 41 may be magnetized in one direction orthogonal to the rotation axis C of the rotating body 32 (one direction parallel to the first surface 41A and the second surface 41B).

The material comprising the second housing 31 may be a nonmagnetic material, and for example should be a nonmagnetic metal material or the like such as aluminum, zinc, copper, or alloys thereof.

Figure 6:
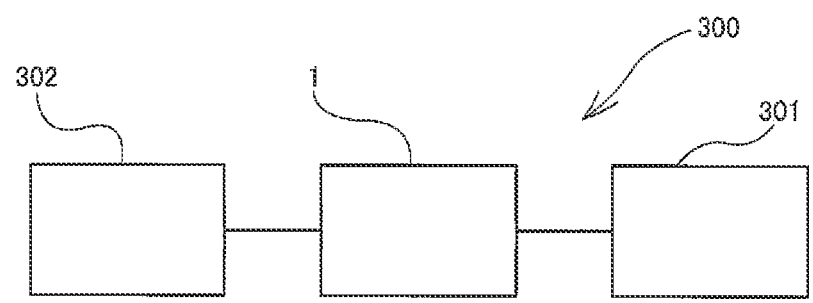
FIG. 6 is a block diagram showing a schematic configuration of a motor unit in one example embodiment.
Figure 7:
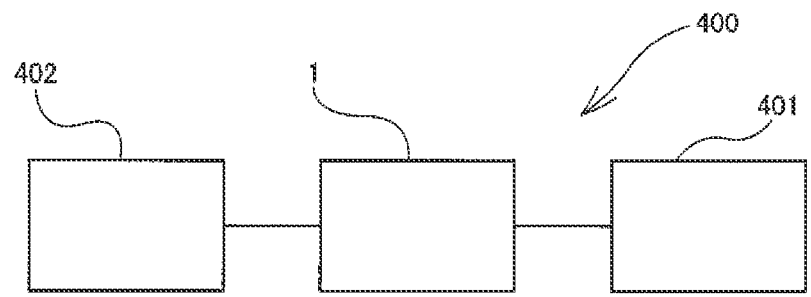
FIG. 7 is a block diagram showing a schematic configuration of a transmission in one example embodiment.

The magnetic field detection device 1 according to the example embodiments can be provided in an electric control device. An electric control device according to the example embodiments can be, for example, a vehicle-use electric control device or the like such as a motor unit, a transmission, an electric power steering device or the like. A motor unit 300 according to the example embodiments include, for example, a motor 301, the magnetic field detection device 1, and an ECU (Electronic Control Unit) 302, for example as shown in FIG. 6. In the motor unit 300, the rotation angle of the motor 301 may be detected by the magnetic field detection device 1, and information about the rotation angle may be transmitted to the ECU 302. Further, for example as shown in FIG. 7, a transmission 400 according to the example embodiments may include the magnetic field detection device 1, a manual shaft 401 and an ECU (Electronic Control Unit) 402. In this transmission 400, the manual shaft 401 rotates according to shift operation by the driver, the rotation angle of the manual shaft 401 may be detected by the magnetic field detection device 1, and information about the rotation angle may be transmitted to the ECU 402. As described above, with the magnetic field detection device 1 according to the example embodiments, the rotation angle can be detected with high accuracy and therefore the magnetic field detection device 1 is especially useful as a sensor for detecting motor or steering wheel rotation angles, engine torque, gear position, and the like, in the above-described electric control device.

With the magnetic field detection device 1 according to the example embodiments, the distance between the magnet 41, as the magnetic field generation unit, and the magnetic field detection unit 51 can be relatively shortened, so a sufficiently stable magnetic field can be applied to the magnetic field detection unit 51 even if a relatively small or inexpensive magnet is used as the magnet 41, making it possible to reduce the size and weight of the magnetic field detection device 1 and reduce manufacturing costs.

The example embodiments described above are described to facilitate understanding of the example embodiments and are not described to limit the present invention. Therefore, each element disclosed in the above example embodiments is intended to include all design modifications and equivalents falling within the technical scope of the present invention. In addition, the dimensions and layouts of each element disclosed in the above example embodiments are intended to be illustrative and not limiting.

Figure 8:
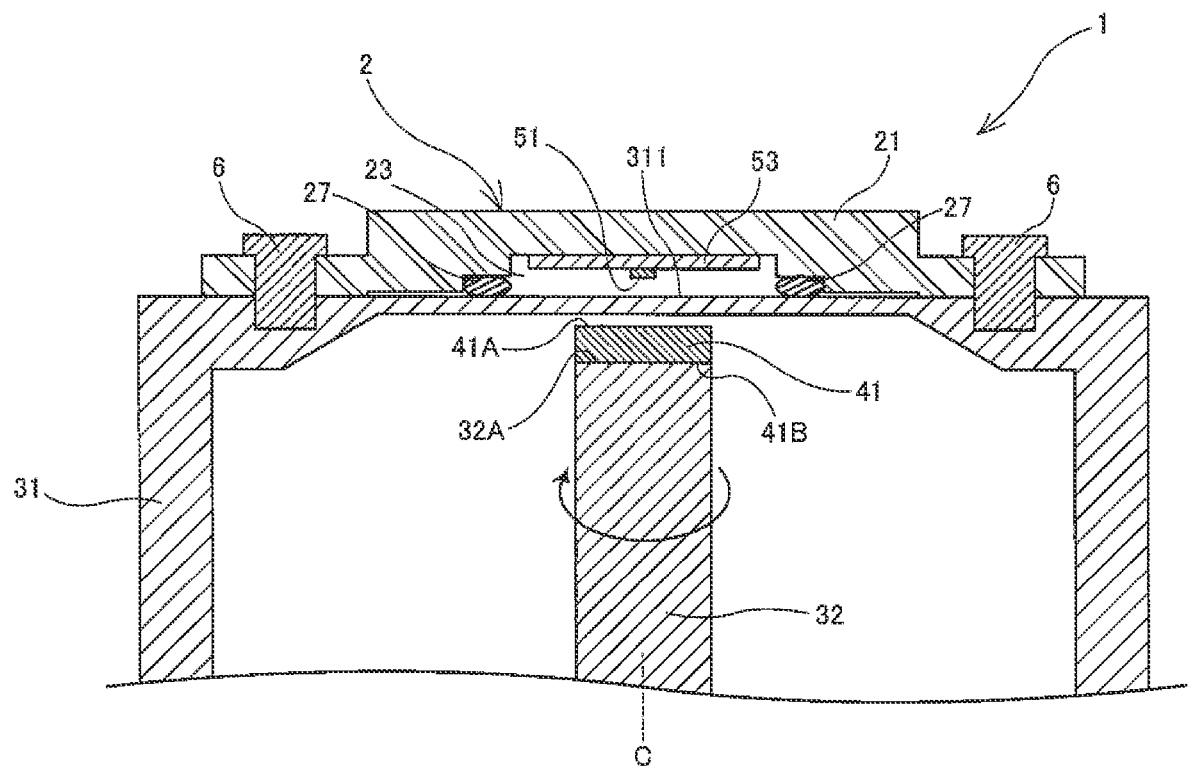
FIG. 8 is a cross-sectional view showing a schematic configuration of another aspect of the magnetic field detection device according to one example embodiment.

In the magnetic field detection device 1 according to the above-described example embodiments, the seal member 27 is fitted into the seal groove 24 surrounding the accommodation unit 23, but the present invention is not limited to this. For example, as shown in FIG. 8, the seal member 27 may be fitted into a stepped portion that is continuous with the outer periphery of the accommodation unit 23 and that is shallower than the depth of the recess of the accommodation unit 23.

Figure 9:
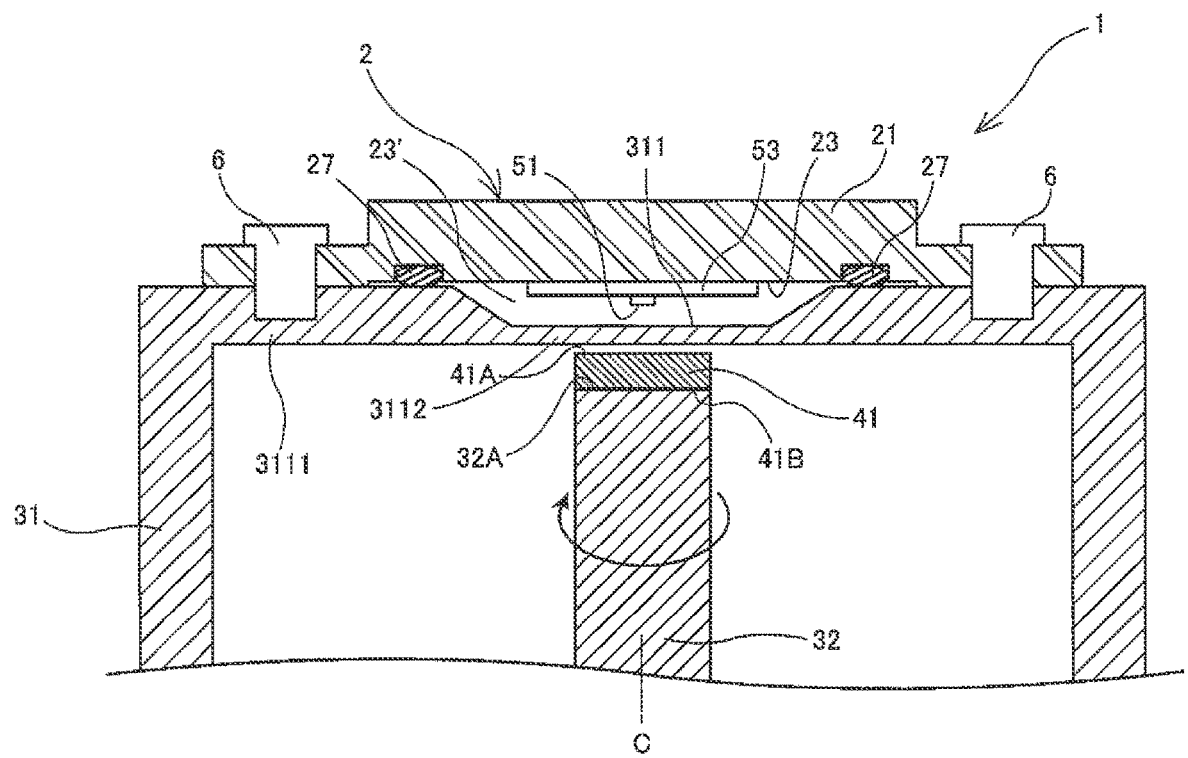
FIG. 9 is a cross-sectional view showing a schematic configuration of another aspect of the magnetic field detection device according to one example embodiment.

In the magnetic field detection device 1 according to the example embodiments, the outer surface of the mounting unit 311 of the second housing 31 (the surface facing the first housing 21) is a flat surface and the second mounting unit 3112 is formed relatively thin by being configured as a recess from the inside of the second housing 31, but this is intended to be illustrative and not limiting. For example, as shown in FIG. 9, the second mounting unit 3112 may be formed relatively thin by a recess being formed in the outer surface of the mounting unit 311 (the surface facing the first housing 21). In this case, the first housing 21 need not be provided with the accommodation unit 23 formed as a recess, and the area surrounded by the seal groove 24 on the first surface 22A of the housing main body 22 may be the accommodating unit 23. Through this, the magnetic field detection unit 51 can be positioned within a sealed space 23' surrounded by the accommodation unit 23, the seal member 27 and the second mounting unit 3112.

Figure 10:
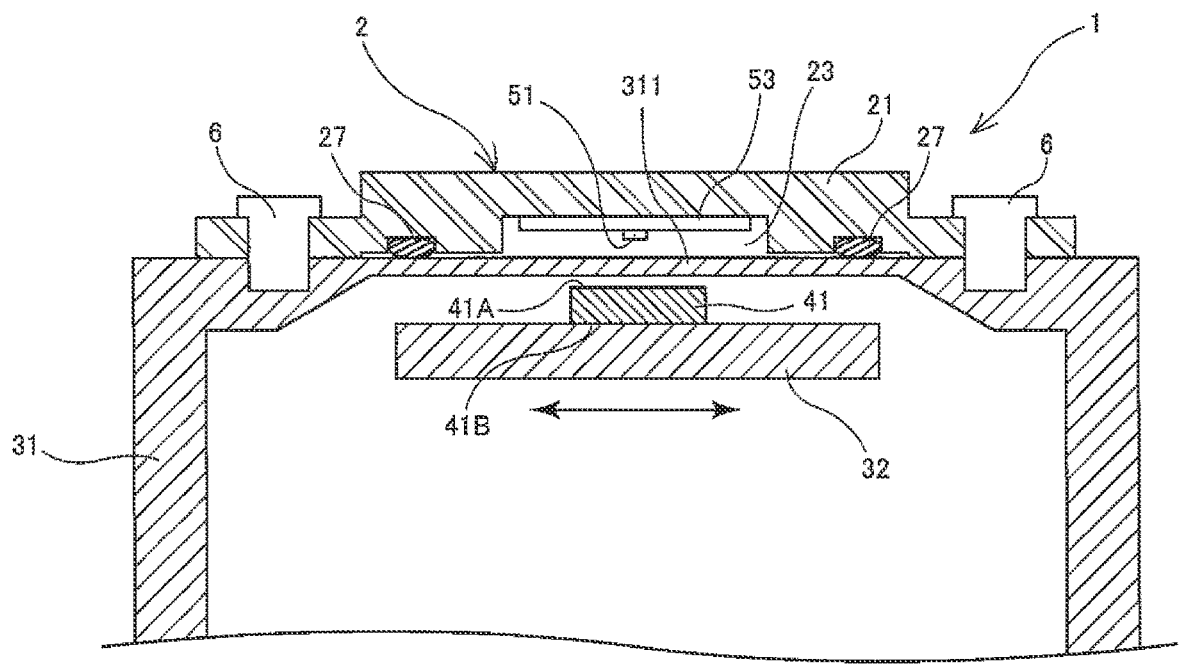
FIG. 10 is a cross-sectional view showing a schematic configuration of another aspect of the magnetic field detection device according to one example embodiment.
Figure 11:
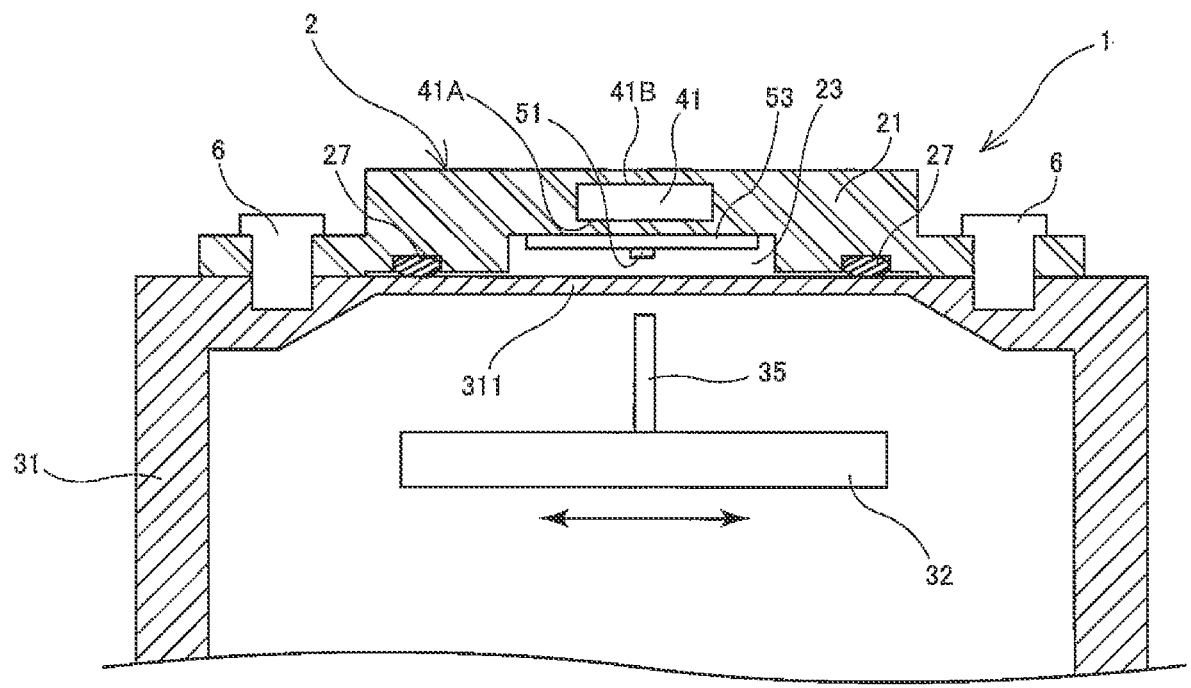
FIG. 11 is a cross-sectional view showing a schematic configuration of another aspect of the magnetic field detection device according to one example embodiment.
Figure 12:
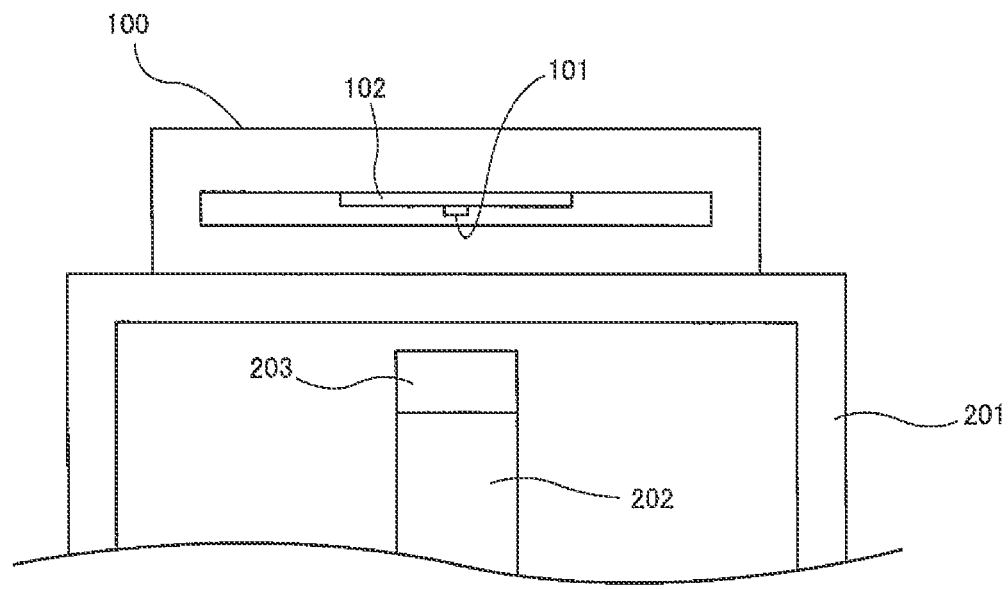
FIG. 12 is a cross-sectional view showing a schematic configuration of a conventional magnetic field detection device.

In the magnetic field detection device 1 according to the example embodiments, an aspect was described in which the magnet 41 is provided at one end 32A of the rotating body 32 as the moving body, and the change in the angle of the magnetic field generated and applied from the magnet 41 rotating integrally with the rotating body 32 is detected by the magnetic field detection unit 51, but this is intended to be illustrative and not limiting. For example, the magnet 41 may be provided on a moving body 32 that moves linearly within the XY plane, the magnet 41 may linearly move integrally with the moving body 32, and changes in the strength or angle of the magnetic field generated and applied from the magnet 41 accompanying this movement may be detected by the magnetic field detection unit 51 (FIG. 10). Further, as shown in FIG. 11, the device may be such that the magnet 41 is provided in the first housing 21, the moving body 32 is provided with a magnetic body 35, and the magnetic body 35 moves linearly together with the moving body 32, and accompanying this, the magnetic field detection unit 51 detects changes in the strength or angle of the magnetic field generated and applied from the magnet 41.

The invention claimed is:

1. A magnetic field detection device comprising:
a magnetic field generation unit that generates a magnetic field;
a magnetic field detection unit that detects the magnetic field;
a first housing that has an accommodation unit that accommodates the magnetic field detection unit; and
a second housing that movably accommodates a moving body;
wherein the strength or angle of the magnetic field generated from the magnetic field generation unit and applied to the magnetic field detection unit changes in accordance with movement of the moving body;
the second housing has a mounting unit on which the first housing is mounted;
the mounting unit has a flat surface facing the first housing;
the accommodation unit has, on one side of the accommodation unit facing the second housing, an opening;
the first housing is mounted on the mounting unit via a seal member that surrounds the magnetic field detection unit, so that the mounting unit is sandwiched between the magnetic field detection unit and the moving body and the opening of the accommodation unit faces the flat surface of the mounting unit; and the inside of the accommodation unit is sealed by closing the opening of the accommodation unit with the seal member and the flat surface of the mounting unit.

2. The magnetic field detection device according to claim 1, wherein the magnetic field generation unit is provided on the moving body to be moveable integrally with the moving body.

3. The magnetic field detection device according to claim 1, wherein the magnetic field generation unit is provided inside the first housing.

4. The magnetic field detection device according to claim 1, wherein in at least one of the first housing and the second housing, a position-determining unit is provided that determines a position at which the first housing is mounted on the second housing.

5. The magnetic field detection device according to claim 4, wherein the position-determining unit is provided more distally than the seal member when viewed from the magnetic field detection unit.

6. The magnetic field detection device according to claim 4, wherein the mounting unit of the second housing includes a first mounting unit that is relatively thick and a second mounting unit that is relatively thin;
the first mounting unit is positioned to surround the second mounting unit; and
the position-determining unit is provided at a position equivalent to the first mounting unit.

7. The magnetic field detection device according to claim 4, wherein the first housing has a first screw hole as the position-determining unit;
the second housing has a second screw hole as the position-determining unit; and
the first housing is fixed to the second housing by a fixing screw inserted into the first screw hole and the second screw hole, which substantially overlap.

8. The magnetic field detection device according to claim 1, wherein the thermal conductivity of a material comprising the seal member is smaller than the thermal conductivity of a material comprising the first housing.

9. The magnetic field detection device according to claim 1, wherein the first housing is fixed to the second housing by a fixing screw.

10. The magnetic field detection device according to claim 1, wherein the first housing has a seal groove into which the seal member is fitted.

11. The magnetic field detection device according to claim 1, wherein the seal member is made of an elastomer material.

12. The magnetic field detection device according to claim 1, wherein the seal member is made of a fluoro-rubber or a silicon rubber.

13. The magnetic field detection device according to claim 1, wherein the first housing is made of polyphenylene sulfide resin, polybutylene terephthalate resin, or polyamide resin.

14. The magnetic field detection device according to claim 1, wherein the second housing is made of a nonmagnetic material.

15. The magnetic field detection device according to claim 1, wherein the moving body is a rotating body that rotates about a predetermined rotation axis or a linearly moving body that moves linearly.

16. A motor comprising at least the magnetic field detection device according to claim 1,
wherein the moving body is a motor shaft capable of rotation about a predetermined rotation axis; and
the magnetic field detection device detects the rotation angle of the motor shaft.

17. A transmission comprising at least the magnetic field detection device according to claim 1;
wherein the moving body is a shaft capable of rotation about a predetermined rotation axis; and
the magnetic field detection device detects the rotation angle of the shaft.

18. The magnetic field detection device according to claim 1, wherein the opening is formed as a recess on the one side.

19. A magnetic sensor module used to detect a magnetic field the strength or angle of which changes accompanying movement of a moving body, the magnetic sensor module comprising:
a magnetic field detection unit that detects a magnetic field generated from a magnetic field generation unit; and
a first housing having an accommodation unit that accommodates the magnetic field detection unit;
wherein the magnetic field detection unit is provided at a position where the magnetic field which is generated from the magnetic field generation unit and the strength or angle of which changes accompanying movement of the moving body is applied to the magnetic field detection unit;
the accommodation unit has, on one side of the accommodation unit facing a second housing, an opening; and
the first housing is configured to be mountable on a second housing that has a mounting unit with a flat surface facing the first housing, that is adapted for the first housing to be mounted thereon, and that movably accommodates the moving body so that the second housing is sandwiched between the magnetic field detection unit and the moving body and the opening of the accommodation unit faces a flat surface of the mounting unit.

20. A magnetic sensor module used to detect a magnetic field the strength or angle of which changes accompanying movement of a moving body, the magnetic sensor module comprising:
a magnetic field detection unit that detects a magnetic field generated from a magnetic field generation unit; and
a first housing having an accommodation unit that accommodates the magnetic field detection unit;
wherein the magnetic field detection unit is provided at a position where the magnetic field, which is generated from the magnetic field generation unit and the strength or angle of which changes accompanying movement of the moving body, is applied to the magnetic field detection unit;
the first housing has a seal member provided to surround the magnetic field detection unit;
the accommodation unit has, on one side of the accommodation unit facing the second housing, an opening that opens one side; and
the first housing is configured to be mountable on a second housing that has a mounting unit with a flat surface facing the first housing, that is adapted for the first housing to be mounted thereon, and that movably accommodates the moving body, so that that the second housing is sandwiched between the magnetic field detection unit and the moving body and the opening of the accommodation unit faces the flat surface of the mounting unit, and so that the inside of the accommodation unit is sealed by closing the opening of the accommodation unit with the seal member and the flat surface of the second housing.

* * * * *